United States Patent [19]
Uchiba et al.

[11] Patent Number: 5,596,623
[45] Date of Patent: Jan. 21, 1997

[54] TESTING AND COMPLAINT ACCEPTING COMMUNICATION UNIT

[75] Inventors: Makoto Uchiba; Yuji Kuroki, both of Fukuoka, Japan

[73] Assignee: Fujitsu Limited, Kanagawa, Japan

[21] Appl. No.: 333,065

[22] Filed: Nov. 1, 1994

[30] Foreign Application Priority Data

May 16, 1994 [JP] Japan ................................. 6-101131

[51] Int. Cl.⁶ ............................ H04M 1/29; H04M 3/08; H04J 1/16; H04J 3/14
[52] U.S. Cl. ................... 379/15; 379/9; 379/27; 379/17; 370/248
[58] Field of Search ....................... 379/1, 10, 9, 11, 379/22, 27, 29, 30, 32, 34; 370/17.14, 17

[56] References Cited

U.S. PATENT DOCUMENTS

| | | | |
|---|---|---|---|
| 4,945,554 | 7/1990 | Krause et al. | 379/10 |
| 5,003,573 | 3/1991 | Agah et al. | 379/1 X |
| 5,111,497 | 5/1992 | Blivena et al. | 379/27 |
| 5,416,825 | 5/1995 | Renaer et al. | 379/10 X |
| 5,428,661 | 6/1995 | Hayashi | 379/10 |

*Primary Examiner*—Wellington Chin
*Assistant Examiner*—Paul Loomis

[57] ABSTRACT

A communication box which operates as a testing and complaint accepting communication unit and which is connected with a workstation which can communicate with a call processor for controlling a digital switch module includes a subscriber line interface connected with a subscriber line from a subscriber line circuit for transmitting/receiving speech signals to/from another telephone connected with one exchange, an inter-office interface connected with an inter-office communication line from an inter-office communication trunk unit for transmitting/receiving speech signals to/from another exchange, and a telephone circuit which connects a head set for talking to allow to select a line of either interface and to call and communicate with either interface under control from the workstation and to communicate or to test a speech condition defined by speech signals monitored at the head set.

7 Claims, 12 Drawing Sheets

TESTING AND COMPLAINT ACCEPTING COMMUNICATION UNIT

BACKGROUND OF THE INVENTION

The present invention relates to a system having a man-machine interface suitable for testing communication lines or for accepting complaints.

As a unit which is connected with a switch module of an exchange for accepting complaints from subscribers and for implementing tests, CATS (Complaint And Transfer Service unit) or MTS (Multi-Telephone Set: name of a set in which telephone, telephone change-over switch and incoming call bell, etc. are connected) is known. These units have a speech function and allow to talk directly with a subscriber or to confirm speech sound during a line test.

However, because the CATS is provided on the assumption that it is connected with the exchange called MS or TS, it cannot be connected directly with a subscriber line circuit SLC.

Further, because the MTS is provided on the assumption that it is used in the exchange connected with terminals of subscribers for testing lines, it cannot be connected directly with a circuit for communicating between offices called an inward trunk circuit IWT or outward trunk circuit OWT.

By the way, workstations WS have come to be used as a method for controlling exchanges lately.

In the maintenance and management of the exchange carried out using such workstation, however, communication with a call processor CPR for controlling a digital switch module DSM is mainly made and the workstation WS itself has no speech function, so that it cannot but rely on the CATS or MTS as before in accepting complaint calls or monitoring line tests.

Accordingly, it is an object of the present invention to solve the aforementioned problem by providing a system having a man-machine interface suitable for testing communication lines or for accepting complaints which realizes a speech function which has been realized in each individual unit such as the CATS or MTS in the past, i.e., the functions for accepting complaints and monitoring line tests, integrally on the workstation and allows to make a quick recovery as a fault occurs.

SUMMARY OF THE INVENTION

In order to achieve the aforementioned goal, according to the present invention, a communication box CBX (testing and complaint accepting communication unit) which is connected with a workstation WS which can communicate with a call processor CPR for controlling a digital switch module comprises a subscriber line interface SLIF connected with a subscriber line SL from a subscriber line circuit SLC for transmitting/receiving speech signals to/from another telephone TEL connected with one exchange, an inter-office interface IWT/OWT-IF connected with an inter-office communication line CL from an inter-office communication trunk unit CTU for transmitting/receiving speech signals to/from another exchange and a telephone circuit TEC for connecting a head set HS for talking to select a line and call with either interface described above under control from the workstation WS to talk or to test a speech condition.

Because the present invention allows to make a speech by means of the head set HS by connecting with the subscriber line circuit SLC or inter-office communication trunk unit CTU as described above, the function of the MTS (for talking directly with a subscriber or for monitoring a speech) which has been realized in the lower rank exchange in the past and the function of the CATS (for accepting complaint or for transferring it to another office) which has been realized in the upper rank exchange can be realized in the single unit and an unitary testing, maintenance and management of the digital switch module can be realized by controlling this unit from the workstation WS.

The above and other related objects and features of the present invention will be apparent from reading of the following description of the disclosure found in the accompanying drawings and the novelty thereof pointed out in the appended claims.

DETAILED DESCRIPTION OF PREFERRED EMBODIMENT

Figure 1:
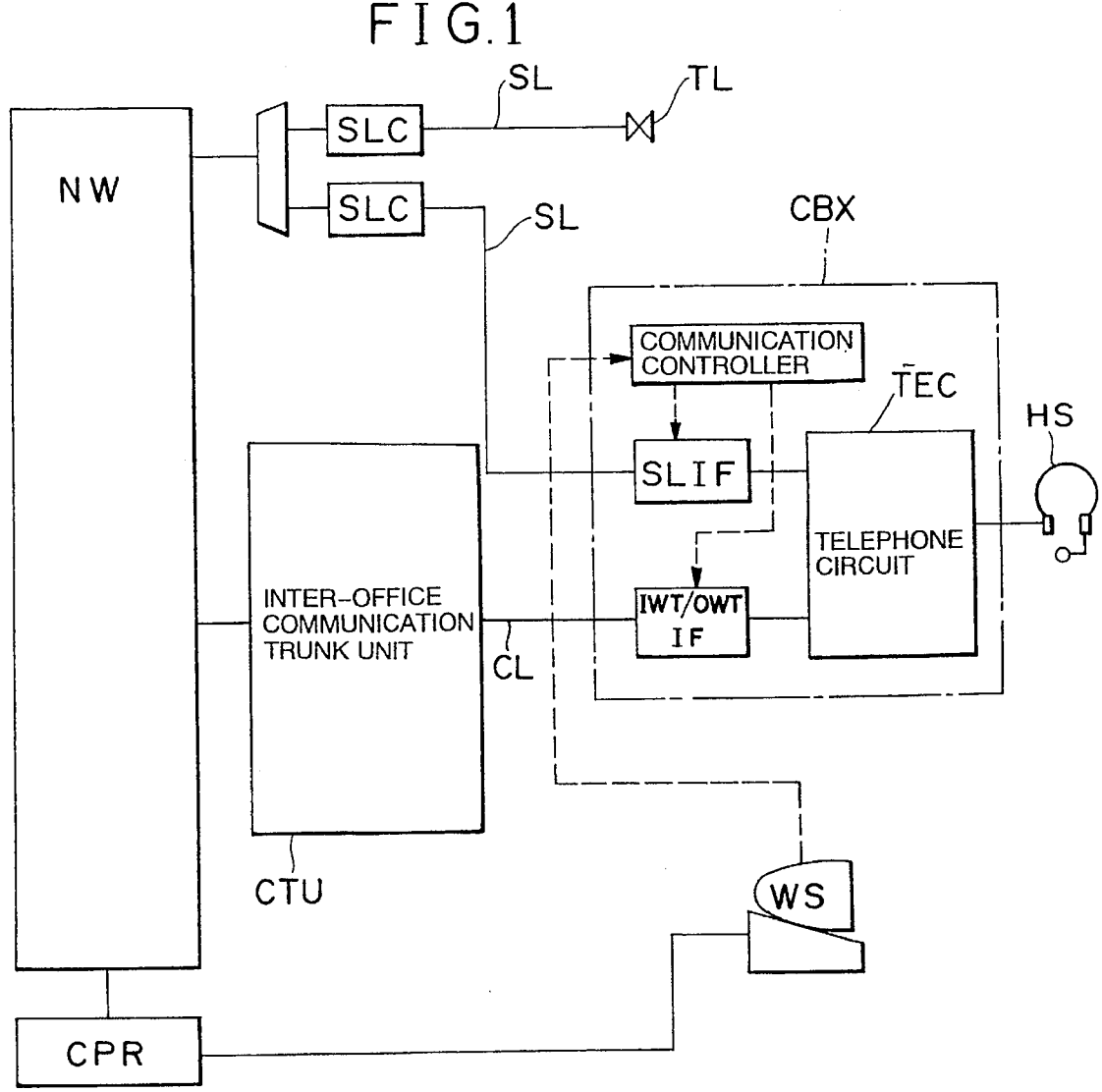
FIG. 1 is a schematic diagram showing a structure of a system of the present invention.

Prior to explaining a concrete preferred embodiment, a schematic structure of the present invention will be explained with reference to FIG. 1.

As shown in the figure, an inventive communication box CBX (testing and complaint accepting communication unit) which is connected with a workstation WS which can communicate with a call processor CPR for controlling a digital switch module DSM comprises a subscriber line interface SLIF connected with a subscriber line SL from a subscriber line circuit SLC for transmitting/receiving speech signals to/from another telephone TEL connected with a lower rank exchange, an inter-office interface IWT/OWT-IF connected with an inter-office communication line CL from an inter-office communication trunk unit CTU for transmitting/receiving speech signals to/from an upper rank exchange and a telephone circuit TEC for connecting a head set HS for talking to select a line and call with each interface described above under the control from the workstation WS to talk or to test a speech condition.

Then, as shown in the figure, an operator is allowed to talk by means of the head set HS by connecting with the subscriber line circuit SLC or inter-office communication trunk unit CTU. Accordingly, the function of the MTS (for talking directly with a subscriber or for monitoring a speech) and the function of the CATS (for accepting complaint or for transferring it to another office) can be realized by a single unit and an unitary testing, maintenance and management of the digital switch module can be realized by controlling this unit from the workstation WS.

Now the preferred embodiment of the present invention will be explained further in detail.

Figure 2:
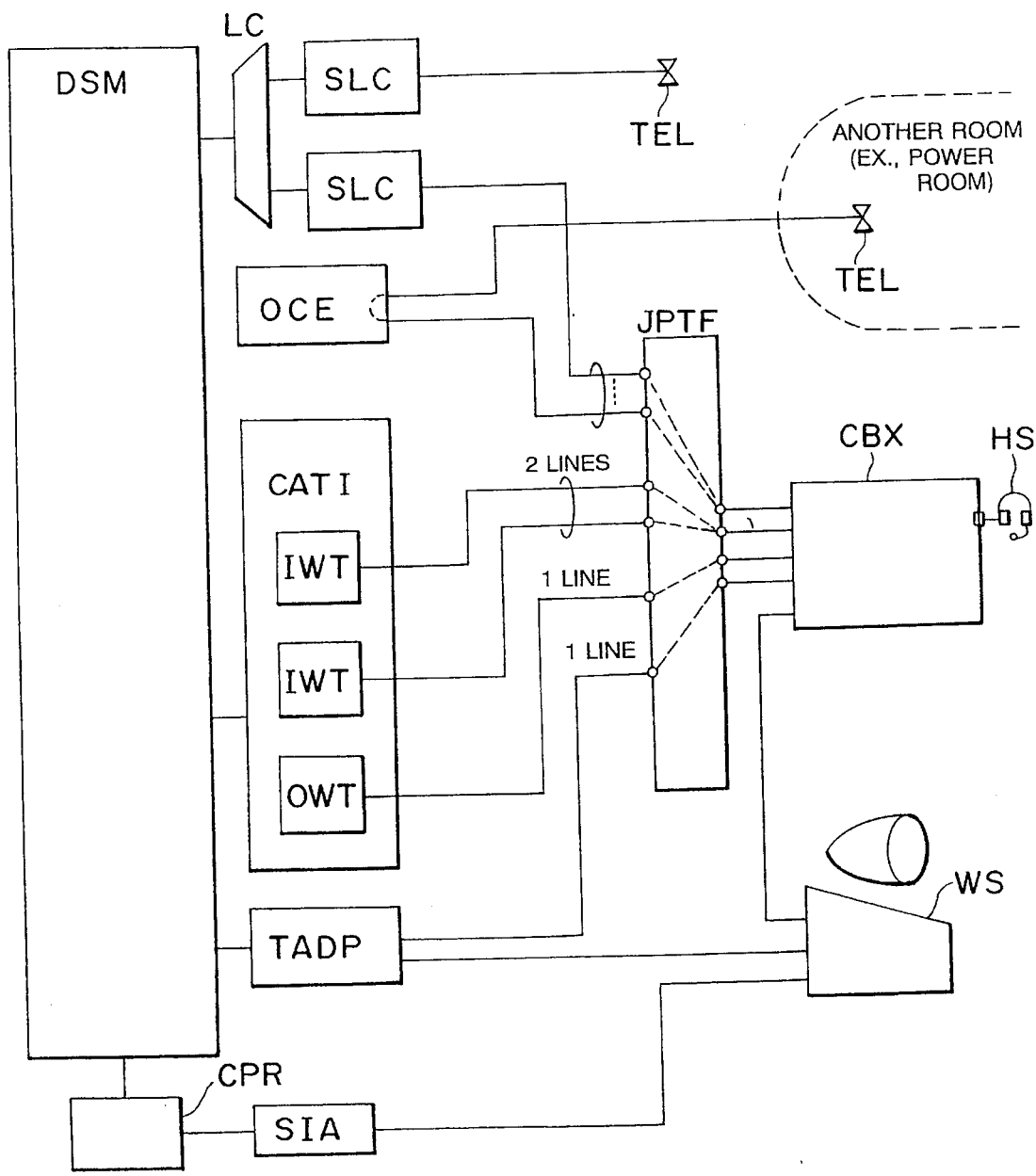
FIG. 2 is a block diagram showing a connection structure of a communication box CBX which is one embodiment of the present invention.

As shown in FIG. 2, the communication box CBX is connected with a digital switch module DSM of the exchange via various units, as explained below.

[Explanation of Structure of Connection System of Communication Box]

The digital switch module DSM is controlled by the call processor CPR and the call processor CPR can be communicated with the workstation WS via a serial interface adapter SIA.

The telephone TEL is connected to the digital switch module DSM via a line concentrator LC and subscriber line circuit SLC.

The digital switch module DSM is provided with, as the inter-office communication trunk unit CTU, a complaint and transfer service interface CATI having an inward trunk circuit IWT and an outward trunk circuit OWT therein.

A terminal adapter TADP as a speech path testing unit for receiving test signals of a speech path is also connected the digital switch module DSM.

The subscriber line circuit SLC, complaint and transfer service interface CATI and terminal adapter TADP are connected to the communication box CBX of the present embodiment via a jumper translating section JPTF.

An office communication equipment OCE which is not connected directly with the digital switch module DSM is connected with the communication box CBX via the jumper translating section JPTF. The office communication equipment OCE is not connected directly with subscribers and is used for communicating in emergency for example with another section within the same office such as a power room or with an adjacent office thereby to allow to make the emergency contact even if the function of the digital switch module DSM is being stopped.

The jumper translating section JPTF has a function capable of physically changing a state of connection of the office communication equipment OCE and complaint and transfer service interface CATI with the communication box CBX. In concrete, it can change a number of lines from the inward trunk circuits IWT or select an interface to be reconnected by replacing connection terminals by means of jumper wires.

The workstation WS is connected with the communication box CBX, terminal adapter TADP and call processor CPR via the serial interface adapter SIA using serial control wire such as RS-232C in the present embodiment. Accordingly, the workstation WS has such a function as directing the communication box CBX to start a test or directing the call processor CPR to cause the digital switch module DSM to execute a specific connection in the present embodiment.

Now a hardware structure of the present embodiment will be explained with reference to FIGS. 3 and 4.

[Structure of Communication Box]

Figure 3:
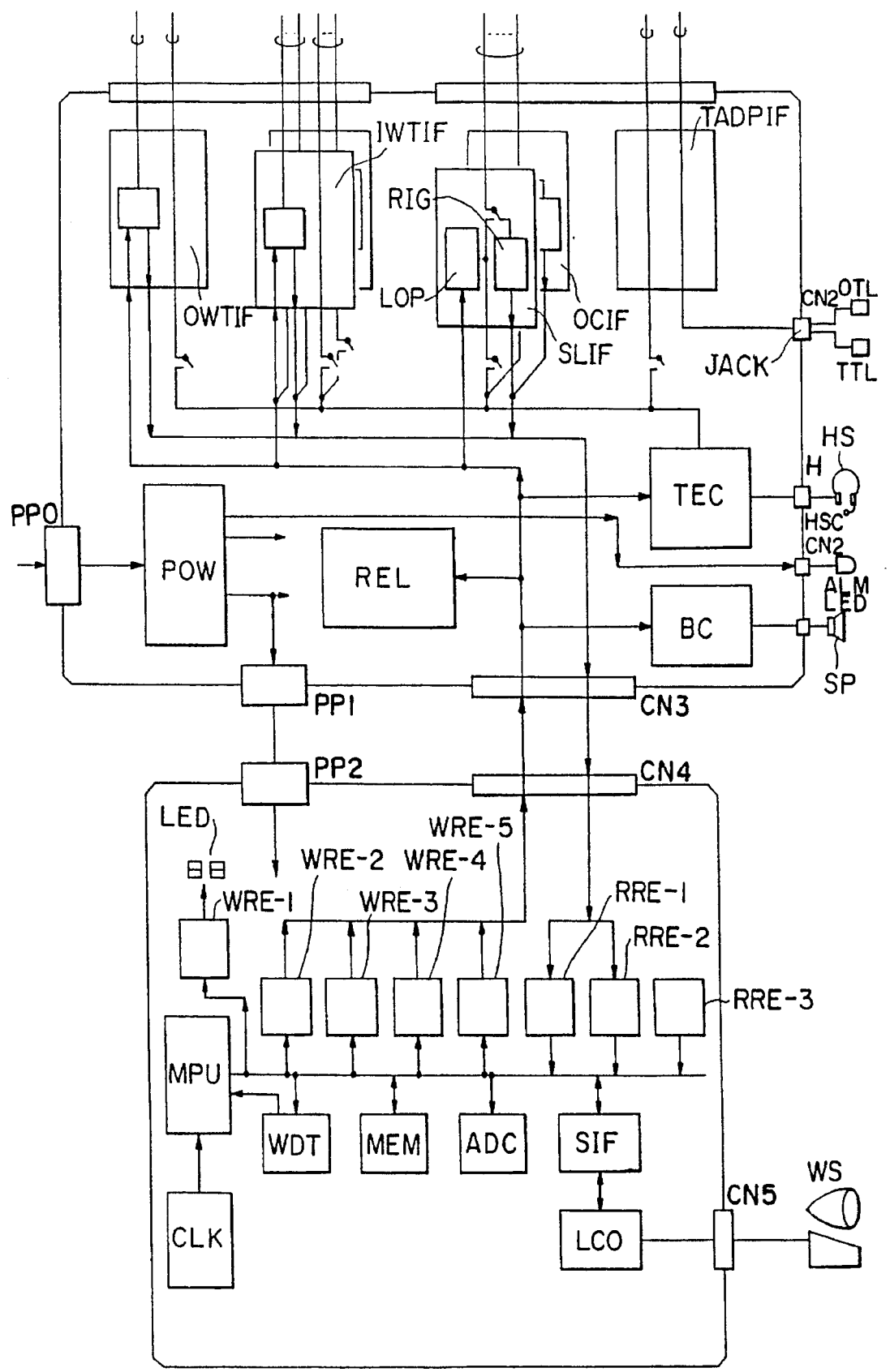
FIG. 3 is a block diagram showing a hardware structure of the communication box CBX of the embodiment.

FIG. 3 shows a structure of the communication box CBX. At the lower part in the figure, there is provided an 8 bit processing micro-processor section MPU which is operated in synchronous with 8 MHz clock pulses obtained by diving 16 MHz clock CLK.

Five write register sections WRE-1 through 5 are connected with the microprocessor section MPU via a bus BUS and among them, one register is used for controlling a display of a display section LED displaying in seven segments. The remaining four write register sections WRE-2 through 5 direct, in combination, the IWT interface IWTIF, OWT interface OWTIF or subscriber line interface SLIF as described later. Three read register sections RRE-1 through 3 are also connected to the bus BUS and the microprocessor section MPU can recognize a state of the IWT interface IWTIF, OWT interface OWTIF or subscriber line interface SLIF by a combination of two read register sections RRE-1 and 2 among them.

A serial interface SIF which is connected with the workstation WS via a level converter LCO is also connected to the bus BUS.

Further, a WDT section WDT, memory MEM, address decoding section ADC and others are connected to the bus BUS. Since they are the same ones with those provided in a normal computer system, explanation thereof will be omitted.

Various interfaces are accommodated in the upper part in FIG. 3. The IWT interface IWTIF and OWT interface OWTIF function as an inter-office interface. The IWT interface IWTIF is connected with the aforementioned inward trunk circuit IWT and is used for accepting and transferring complaints or for communicating between offices. The OWT interface OWTIF is connected with the aforementioned outward trunk circuit OWT and is used for communicating between offices.

The subscriber line interface SLIF is connected with the aforementioned subscriber line circuit SLC to be connected with a telephone TEL to realize a direct communication with a subscriber. A loop circuit LOP and ringer circuit RIG are provided in the subscriber line interface SLIF. The loop circuit LOP may be provided within a telephone circuit TEC. When there is an incoming call from the outside, the ringer circuit RIG detects its ringer. The loop circuit LOP realizes an off-hook state.

In the present embodiment, four subscriber line interfaces SLIF are maintained to allow to connect the inventive unit with four external lines. The subscriber line interface SLIF of one line among them functions as an office communication interface OCIF and is used for communicating in emergency with another section within the same office such as a power room or with an adjacent office and the aforementioned office communication equipment OCE which is connected with the office communication interface OCIF is not connected with the digital switch module DSM.

A terminal adapter interface TADPIF is connected with the aforementioned terminal adapter TADP and receives test signal tones output from a test tone generator ALTI described later.

The IWT interface IWTIF, OWT interface OWTIF, subscriber line interfaces SLIF, office communication interface OCIF and terminal adapter interface TADPIF are connected to the telephone circuit TEC within this unit and the telephone circuit TEC is connected with the head set HS via a head set connector HSC.

Further, a power section POW, relay driving section REL and buzzer circuit BC as a sounding device are provided within this unit. The buzzer circuit BC is connected with a speaker SP or buzzer (not shown) via a connector CN2 and outputs buzzer sound when called.

The microprocessor section MPU controls the telephone circuit TEC and buzzer circuit BC and allows to communicate by the head set HS or to generate buzzer sound by the speaker SP for example by operating from the workstation WS.

Figure 4:
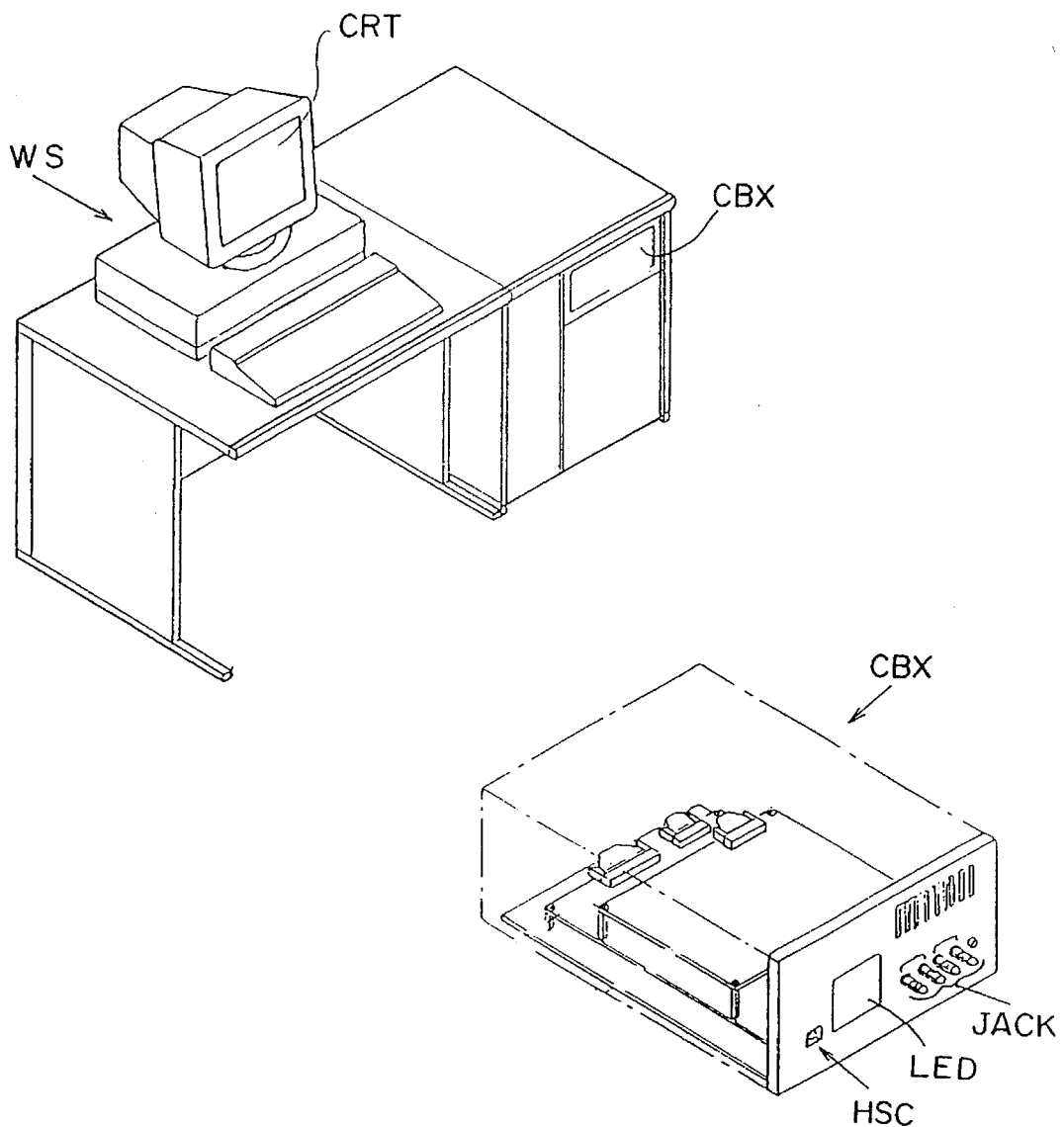
FIG. 4 is a perspective view showing outside views of a workstation WS and the communication box CBX.

FIG. 4 is a perspective view showing outside views of the workstation WS and communication box CBX. As shown in the figure, an operator console is composed of the main body of the workstation WS, display unit CRT and others. The communication box CBX of the present embodiment is accommodated in a wing section of the console, exposing its front panel.

Disposed on the front panel of the communication box CBX are a display section LED, head set connector HSC and external terminals JACK. A head set (composed of a microphone and speaker which is put on the head of an operator) not shown here is connected to the head set connector HSC. Accordingly, the operator can monitor lines or talk with a subscriber through the head set, HS while monitoring the display unit CRT of the workstation WS.

Next, functions of the inventive unit realized based on the hardware structure described above will be explained.
[Speech Path Test]

Figure 5:
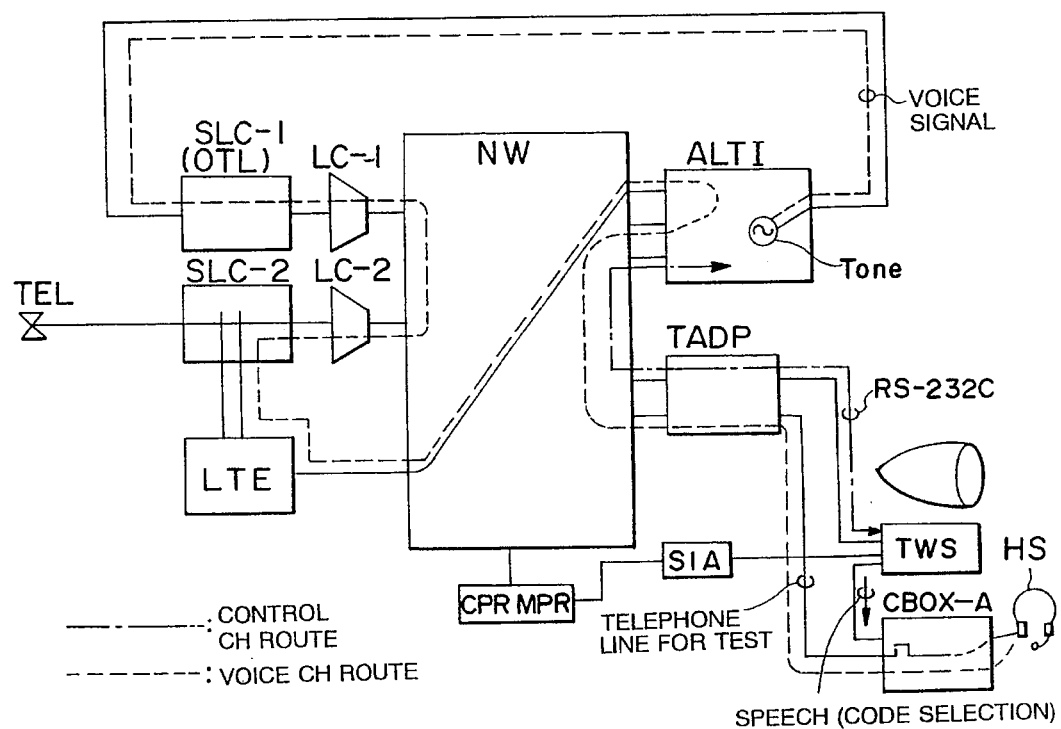
FIG. 5 is a diagram for explaining a speech path test according to the embodiment.

A speech path test is a test for confirming a speech path by a test signal (voice signal) through the subscriber line circuit SLC and the digital switch module DSM. FIG. 5 shows a structure necessary for this speech path test.

At first, the workstation WS is operated to cause, through the terminal adapter TADP and via the network NW, the test tone generator ALTI to generate a test signal (tone voice signal). This test signal is transmitted to the subscriber line circuit SLC-1 without passing through the digital switch module DSM. Here, the test tone generator ALTI and the subscriber line circuit SLC-1 have a private communication line capable of communicating without passing through the digital switch module DSM. The test signal arrived at the subscriber line circuit SLC-1 is returned to the test tone generator ALTI going through a route of the line concentrator LC-1→digital switch module DSM→line concentrator LC-2→subscriber line circuit SLC-2→relay terminal LTE→digital switch module DSM. Then, this test signal is returned and input again to the communication box CBX via the digital switch module DSM and terminal adapter TADP.

By the way, the routes of the test signal within the digital switch module are controlled by the call processor CPR directed by the workstation WS to realize such complicated routes.

As the above-mentioned test is started, the workstation WS directs the communication box CBX to select the terminal adapter interface TADPIF. Within the communication box CBX, the microprocessor section MPU rewrites the write register sections WRE-2 through 4 to open the terminal adapter interface TADPIF to accept the signal from the terminal adapter TADP.

The operator can now confirm the test signal as voice information by own ears by the head set HS connected to the communication box CBX. When a measuring instrument such as an oscilloscope is connected to the external terminal JACK, characteristics of the transmission path may be checked by measuring the test signal.
[Connection with General Subscriber Line and OCE Line]

When an exchange is a lower rank office and accommodates general subscriber lines SL, the communication box CBX of the present invention allows to make a speech with a telephone TEL of the general subscriber.

Figure 6:
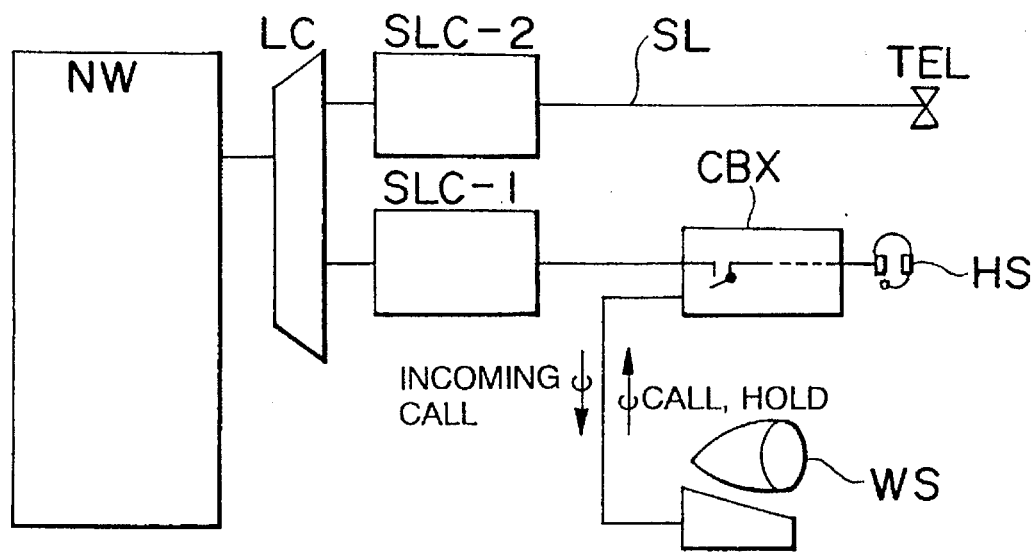
FIG. 6 is a diagram for explaining a connection with a general subscriber line according to the embodiment.

FIG. 6 shows this function. As shown in the figure, when a call is to be made from the communication box CBX, an off-hook instruction signal is issued from the workstation WS to the communication box CBX. When the microprocessor section MPU in the communication box CBX recognizes an acceptance of this signal, it returns an answer signal ACK to the workstation WS.

The communication box CBX puts an appropriate line (e.g., a subscriber line SL) into an off-hook state based on the off-hook instruction signal and selects a code so that said line is taken into the communication box CBX. This off-hook operation is carried out concretely by changing over the line within the subscriber line interface SLIF from the ringer circuit RIG to the loop circuit LOP.

Next, either the line of the subscriber line circuit SLC or of the office communication equipment OCE is selected. That is, the subscriber line interface SLIF is opened in the case of the former and the office communication interface OCIF is opened in the case of the later.

Next, when a dialing instruction is issued from the workstation WS, a dialing pulse (or tone pulse) is sent out from the loop circuit LOP.

The call is made through the subscriber line interface SLIF by this dialing pulse. This call is transmitted to the telephone TEL of the subscriber through the subscriber line circuit SLC→line concentrator LC-1→digital switch module DSM→line concentrator LC-2→subscriber line SL.

Similarly, the communication box CBX can receive a call from the telephone TEL of the subscriber through a path reversed from that mentioned above. At this time, when the microprocessor section MPU in the communication box CBX recognizes the incoming call through the subscriber line interface SLIF, it operates the buzzer circuit BC to generate a buzzer sound from the speaker SP to inform the operator of the incoming call. At this time, the microprocessor section MPU also informs the workstation WS of a connection signal indicating the connection through a serial interface (SIF).

Figure 15:
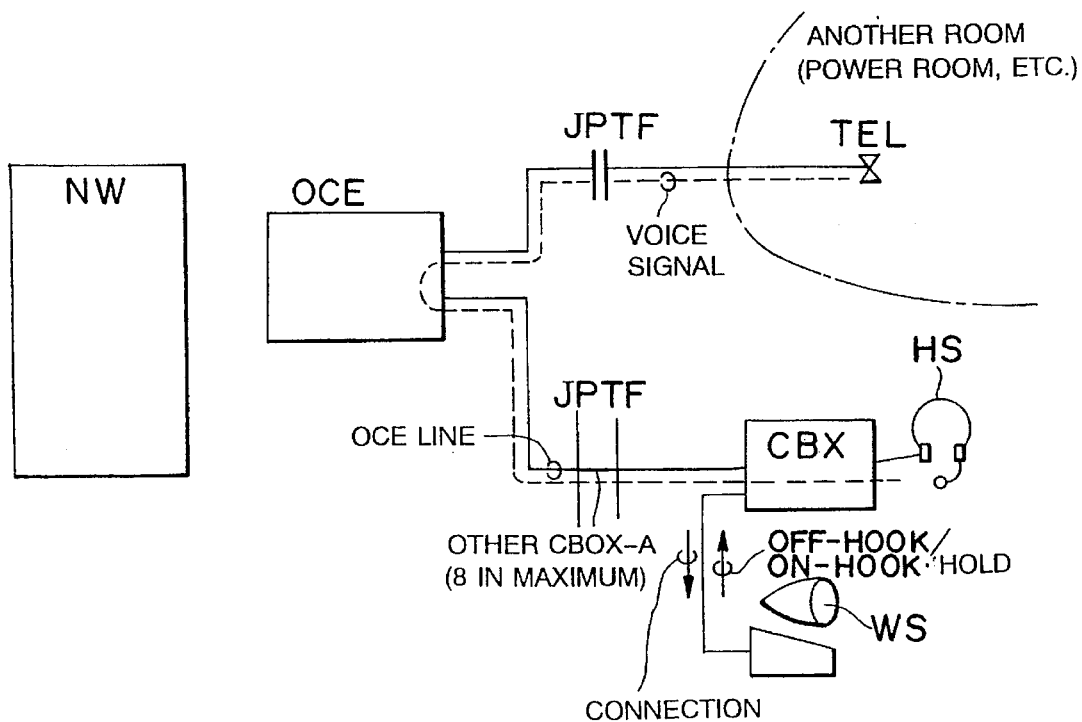
FIG. 15 is a structural diagram for explaining a connection with the OCE line according to the embodiment.

By the way, the work station WS can direct the communication box CBX which is in communication with the telephone TEL to hold the communication. In this case, the communication with the telephone TEL may be held by operating the loop circuit LOP of the subscriber line interface SLIF. While the explanation above has been made for the case when the subscriber line SL has been selected, a call from the office communication interface OCIF is transmitted directly to a telephone TEL installed in another room within the same office by the office communication equipment OCE as shown in FIG. 15 when the OCE line is selected by the instruction from the workstation WS.
[Inward Trunk (IWT) Function]

The IWT line is used for accepting complaints and for communicating (connecting) between offices in the upper rank exchange (MT office, TS office) to which no subscriber line SL is connected.

Figure 7:
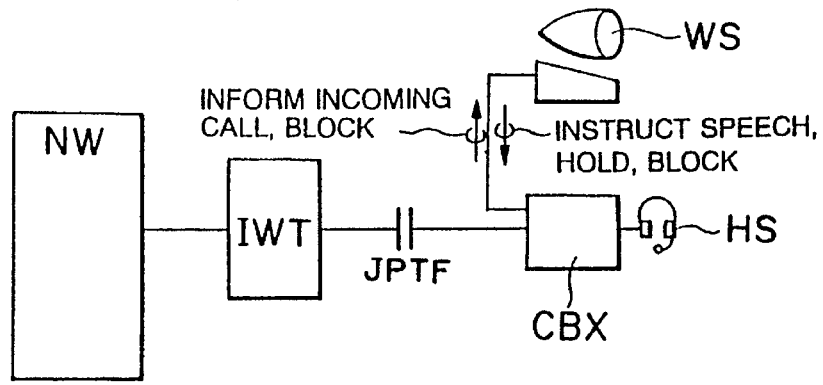
FIG. 7 is a diagram for explaining an inward trunk circuit IWT according to the embodiment.

FIG. 7 shows a structure necessary for this embodiment.

A connection signal which the communication box CBX of the present embodiment has received from the inward trunk circuit IWT through the IWT interface IWTIF is informed to the microprocessor section MPU by rewriting the write registers (WRE-2 through 4). The microprocessor section MPU further informs the workstation WS of this connection information. Based on this information, the workstation WS directs the communication box CBX to respond to an appropriate line. Based on this direction, the microprocessor section MPU selects a code (by the write register sections) of the appropriate line and selects the IWT interface IWTIF. Thus a situation in which complaints can be accepted or speech from another office can be made is created and the operator can communicate with a subscriber or an operator of another office through the head set HS connected to the communication box CBX.

Figure 8:
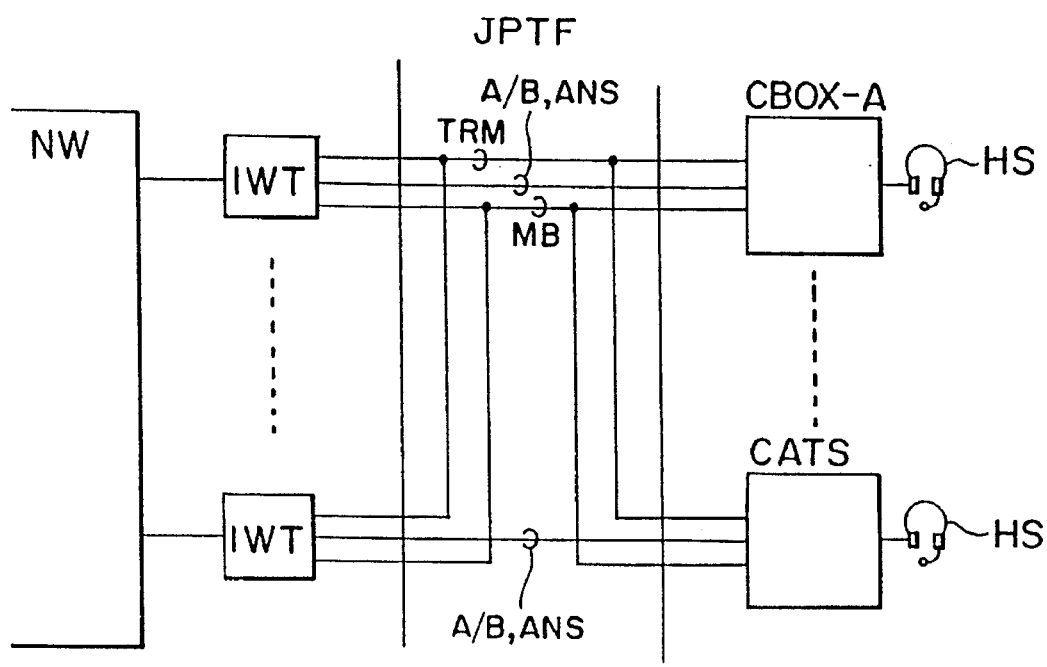
FIG. 8 is a diagram showing an example of connection wherein the communication box CBX and a complaint and transfer service unit CATS are connected in parallel.

FIG. 8 shows an example of connection where the communication box CBX of the present embodiment and the complaint and transfer service unit CATS are connected in parallel. As shown in the figure, it is possible to mutually connect wires from a pair of inward trunk circuits IWT-1 and IWT-2 with the communication box CBX and complaint and transfer service unit CATS in the jumper translating section JPTF. The realization of such parallel connection allows to use the existing complaint and transfer service unit CATS as it is for example and to smoothly handle the acceptance of complaints or inter-office communication even when the complaint and transfer service unit CATS is installed at a location distant from the workstation WS.

[Outward Trunk (OWT) Function]

The OWT line is used for communicating between offices (for calling) in the upper rank exchange (MT office, TS office) to which no subscriber line SL is connected.

Figure 9:
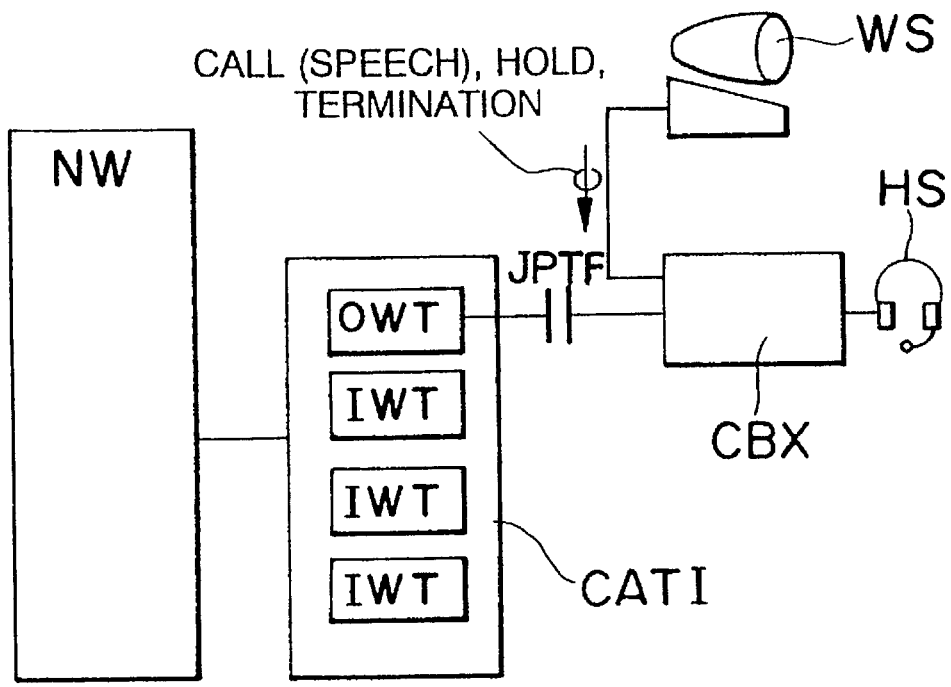
FIG. 9 is a diagram for explaining an outward trunk circuit OWT according to the embodiment.

FIG. 9 shows a structure necessary for this embodiment.

When a call is made to another office for example in the present embodiment, the workstation WS directs the communication box CBX to make the call. This call direction is made by selecting a code of the OWT line, i.e., by activating the OWT interface OWTIF.

Next, the loop circuit (not shown) in the OWT interface OWTIF is put into a state connected with the line to output an OBB signal. This OBB signal is what similar to the dialing tone signal in the subscriber line SL. Thereby the OWT line is put into an off-hook state and a dialing signal is sent out by as directed from the workstation WS. This signal is sent from the outward trunk circuit OWT to an inward trunk circuit IWT of another office through the digital switch module DSM. A communication with another appropriate office is made through the head set HS connected to the communication box CBX.

Thus, the function which the complaint and transfer service unit CATS have had in the past can be performed under the control of the workstation WS and specifically, complaints can be handled or the inter-office communication can be made while monitoring the display unit CRT of the workstation WS according to the present embodiment.

[Test Using External Terminals]

Figure 10:
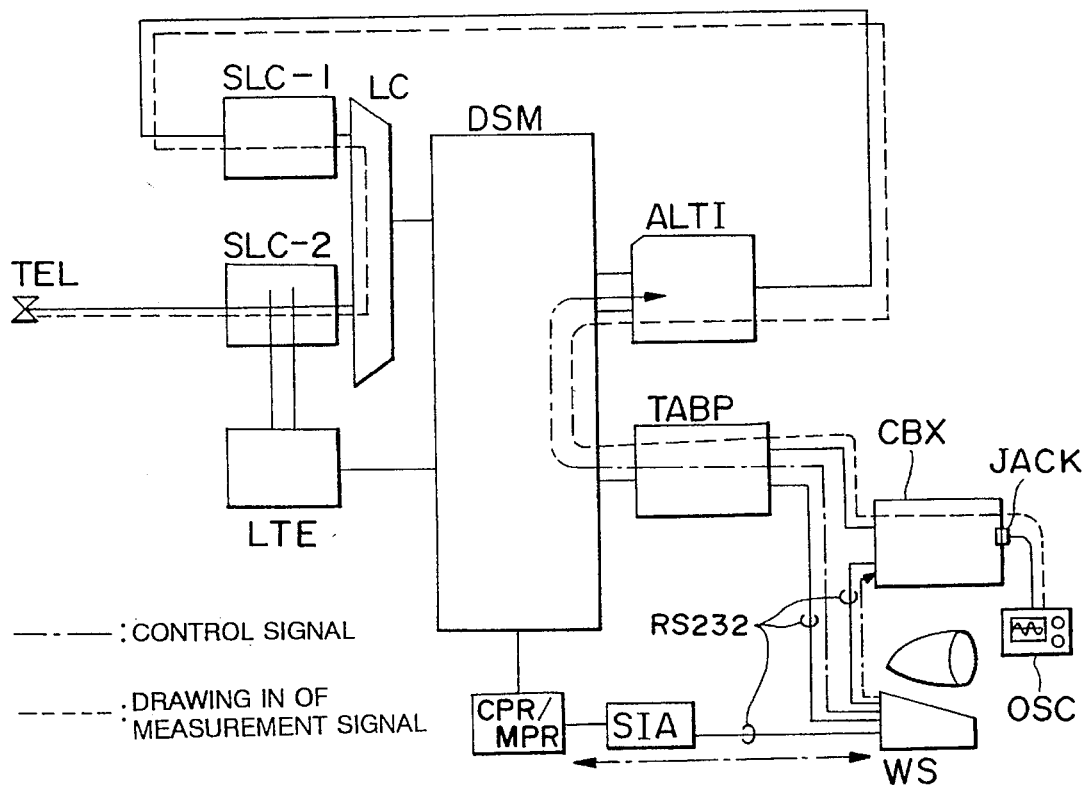
FIG. 10 is a diagram showing an example of connection when a characteristic measurement of a transmission path is carried out using the communication box CBX according to the embodiment.

FIG. 10 shows an example of connection when a characteristic measurement of a transmission path is made using the communication box CBX.

This test is carried out to test transmission characteristics of a line between the subscriber line circuit SLC-2 and the telephone TEL when a fault such as a cross or induction is found from a complaint call from a subscriber for example.

In the figure, an oscilloscope is connected to the external terminal JACK of the communication box CBX to allow to display and measure characteristics of the transmission path.

When the workstation WS directs the communication box CBX to start the test, the microprocessor section MPU opens the terminal adapter interface TADPIF to put into a standby state in which the measurement can be made by the oscilloscope OSC connected to the external terminal JACK.

Next, the workstation WS sends out a control signal from the terminal adapter interface TADPIF and terminal adapter TADP to the test tone generator ALTI via the digital switch module DSM. Receiving the control signal, the test tone generator ALTI makes a call to the telephone TEL of the subscriber. This call is returned in the line concentrator LC from the subscriber line circuit SLC-1 to the subscriber line circuit SLC-2 without passing through the digital switch module DSM to call the telephone TEL.

When the call between the telephone TEL and the test tone generator ALTI is established, its communication state (frequency characteristics of the transmission path) is measured by the oscilloscope OSC connected to the communication box CBX through the terminal adapter TADP.

By the way, the workstation WS transmits the control signal to the call processor CPR through a serial interface adapter SIA and based on this control signal, the call processor CPR controls switches within the digital switch module DSM so that the control signal described above from the terminal adapter TADP is input to the test tone generator ALTI in the digital switch module DSM.

[Buzzer Function]

The buzzer function is achieved by buzzing from the speaker SP connected to the buzzer circuit BC by an instruction from the workstation WS when the buzzer circuit BC is opened by the microprocessor section MPU and a ringer is detected through the ringer circuit RIG of the subscriber line interface SLIF.

This buzzing is used to inform of an incoming call in the subscriber line SL, OCE line, IWT line and speech path test line drawn into the communication box CBX.

Figure 11:
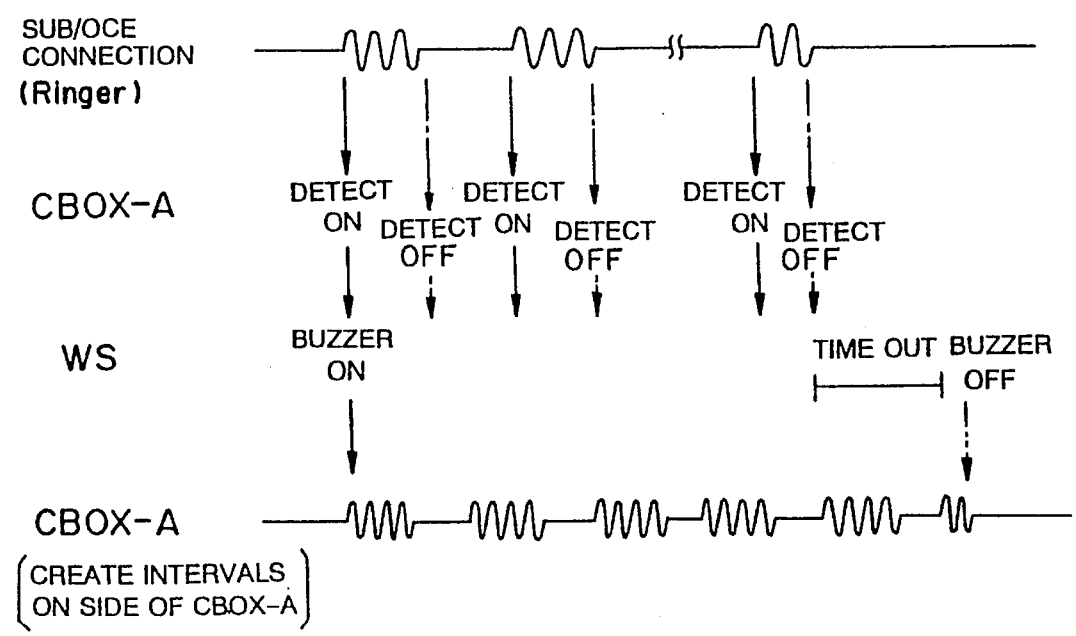
FIG. 11 is an explanatory diagram showing a sequence of buzzing caused by an incoming call from the subscriber line SL or OCE line according to the embodiment.

FIG. 11 shows a sequence of buzzing caused by an incoming call from the subscriber line SL or OCE line.

At first, an intermittent ringer is detected through the ringer circuit RIG of the subscriber line interface SLIF or office communication interface OCIF. The microprocessor section MPU informs the workstation WS of the first detection of said ringer. When the detection of the ringer is recognized, the workstation WS causes the communication box CBX to activate the buzzer circuit BC to buzz from the speaker SP. As shown in FIG. 11, the buzzer sound is generated through the buzzer circuit BC independently within the unit according to the present embodiment, so that its intermittent intervals can be set independently from that of the ringer and the buzzer can be kept sounding for a certain period of time (until a time-out time) after when the incoming ringer has stopped.

Figure 12:
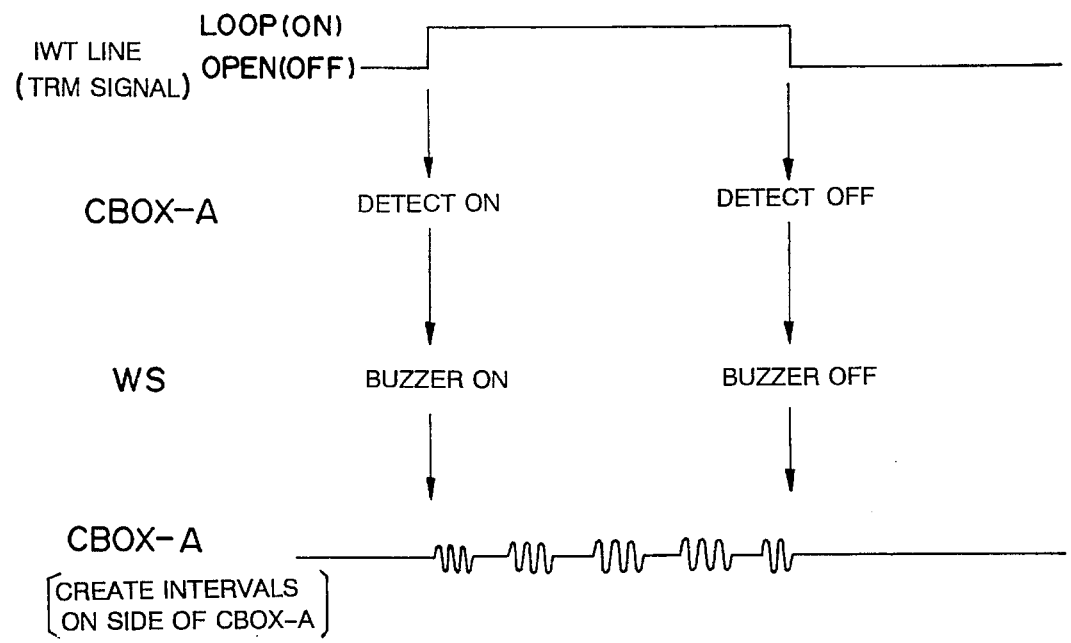
FIG. 12 is an explanatory diagram showing a sequence of buzzing for informing of an incoming call from an IWT line according to the embodiment.

FIG. 12 shows a sequence of buzzing for informing an incoming call from the IWT line. When the IWT interface IWTIF detects that a TRM signal is ON, it is informed to the workstation WS. Then, the microprocessor section MPU instructs the buzzer circuit BC to buzz intermittently by the instruction given from the workstation WS. At this time, because the incoming TRW signal is not intermittent differing from the above-mentioned ringer, the communication box CBX generates intervals based on the clock CLK by itself to realize intermittent buzzing.

Figure 13:
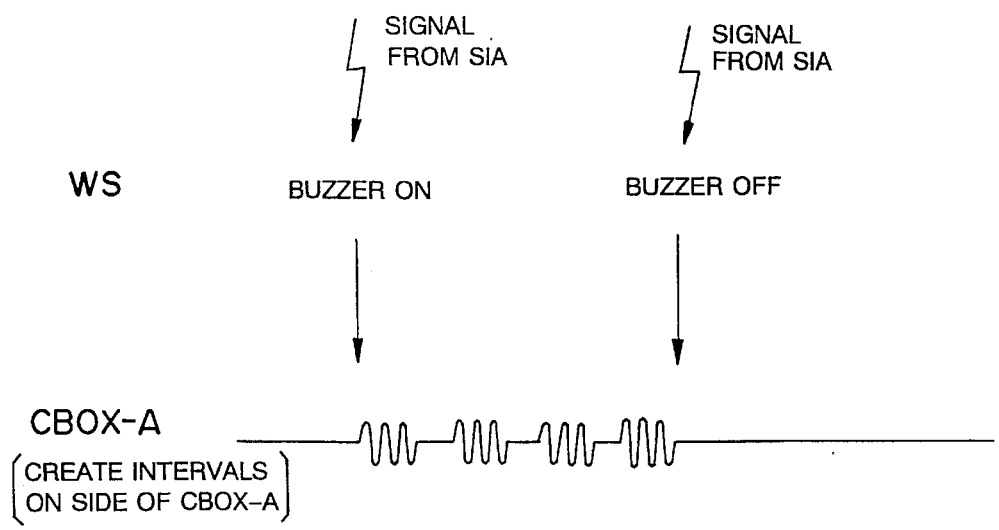
FIG. 13 is an explanatory diagram showing a sequence of buzzing in a speech path test according to the embodiment.

FIG. 13 shows a sequence of buzzing in a speech path test. In the figure, when a signal is input through the terminal adapter interface TADPIF, the communication box CBX generates intervals based on the clock CLK by itself to generate intermittent buzzing.

[Transmission Cutoff Function]

The transmission cutoff function TCO is a function for inhibiting a communication between the communication box CBX and the outside and is used mainly for interrupting a communication.

Figure 14:
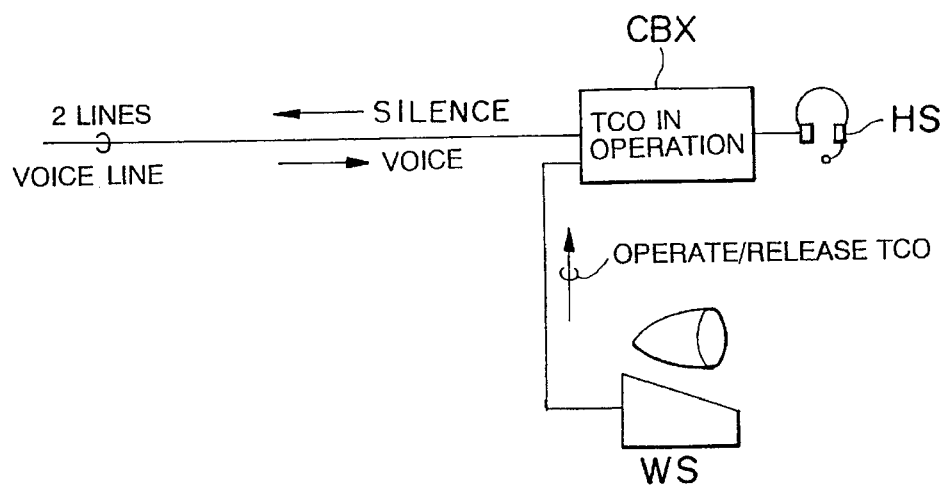
FIG. 14 is an explanatory diagram for explaining a realization of transmission cutoff function according to the embodiment.

When a command is issued from the workstation WS to the communication box CBX as shown in FIG. 14, this function causes the microprocessor section MPU to control the OWT interface OWTIF, subscriber line interface SLIF or office communication interface OCIF to interrupt its communication with the outside.

The interruption is released in the same manner as described above by an instruction from the workstation WS.

While the preferred embodiments have been disclosed, variations thereto will occur to those skilled in the art within the scope of the present inventive concepts which are delineated by the following communication line Claims.

What is claimed is:

1. A communication box which is connected with a workstation which can communicate with a call processor for controlling a digital switch module, comprising:

subscriber line interface means connected with a subscriber line from a subscriber line circuit for transmitting/receiving speech signals to/from another telephone connected with one exchange;

inter-office interface means connected with an inter-office communication line from an inter-office communication trunk unit for transmitting/receiving speech signals to/from another exchange; and a telephone circuit for connecting a head set for talking;

wherein said communication box allows to select a line of one of said subscriber line interface means and said inter-office interface means to call and communicate with said subscriber line interface means or said inter-office interface means under control from said workstation and to communicate or to test a speech condition defined by monitoring test signals at said head set.

2. The communication box according to claim 1, further comprising a terminal adapter interface connected with said digital switch module via a terminal adapter for monitoring a test signal tone received by said terminal adapter at said head set.

3. The communication box according to claim 1, further comprising an office communication interface connected with an office communication equipment for communicating within same office or with an adjacent office without passing through said digital switch module for permitting to make an emergency contact within the same office or with the adjacent office through said head set.

4. The communication box according to claim 2, further comprising an external terminal which allows to connect an inspecting instrument for measuring transmission characteristics of a subscriber line circuit or a subscriber line.

5. The communication box according to claim 1, further comprising buzzing means for discriminating a call from the outside and whose sound is controlled by said workstation.

6. The communication box according to claim 1, further comprising transmission cutoff means for interrupting a communication by means of said head set by controlling from said workstation.

7. The communication box according to claim 1, which is disposed near a console on which a display unit of said workstation is provided so that a maintenance and management operator can make a speech or monitor said speech condition by means of said head set while monitoring said display unit.

* * * * *